(No Model.)

S. GELDBRANT.
COFFEE POT.

No. 505,042. Patented Sept. 12, 1893.

Attest:
Cle Budine
W. Hume Clendenin

Inventor
Svan Geldbrant
per
DuBois&DuBois
Attys

UNITED STATES PATENT OFFICE.

SVAN GELDBRANT, OF GALESBURG, ILLINOIS.

COFFEE-POT.

SPECIFICATION forming part of Letters Patent No. 505,042, dated September 12, 1893.

Application filed June 1, 1893. Serial No. 476,290. (No model.)

*To all whom it may concern:*

Be it known that I, SVAN GELDBRANT, a citizen of the United States, residing at Galesburg, in the county of Knox and State of Illinois, have invented certain new and useful Improvements in Coffee-Pots; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of coffee-pots wherein the coffee-grounds are suspended in a perforated receptacle above the bottom of the pot; my object being to produce a construction whereby the boiling water will more readily pass through the grounds.

A further object is to produce a pot whereby the contents will be more quickly heated than in the ordinary pot, and the coffee thus boiled in a much shorter space of time.

With such objects as these in view, my invention consists of the peculiarities of construction such as will be fully described hereinafter and finally pointed out in the claim.

Figure 1:
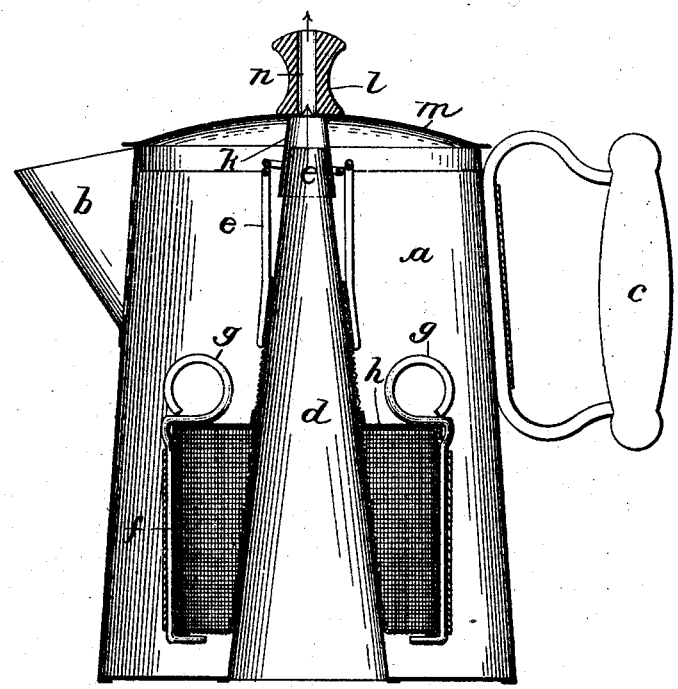
Figure 2:
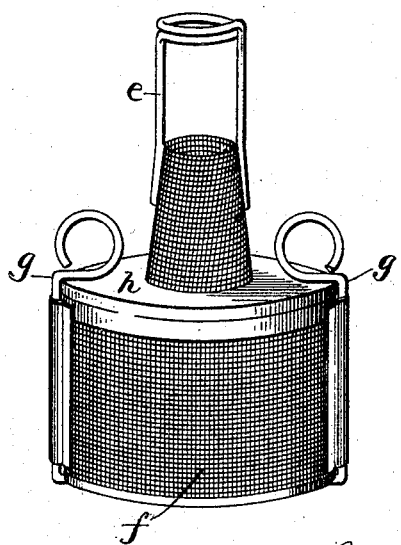

In the accompanying drawings which illustrate my invention: Figure 1 represents a vertical section thereof. Fig. 2 represents a perspective view of the grounds-receptacle.

In the accompanying drawings the reference letter $a$ represents the body of the coffee-pot, which is provided with the usual spout $b$ and handle $c$, in the present instance shown diametrically opposite each other.

Formed in the bottom of the pot and arising into the interior a distance equal to the height of the pot, so that its upper end will lie flush with the top thereof, is a conical projection $d$, the diameter of its lower end being about one-third of that of the bottom of the pot, while its upper end tapers and ends in a small opening $e$, the purpose of which will be described later. By means of the conical projection $d$ it will be seen that a greater space is open to the action of the heat, and thus a much larger surface of water is acted upon at one time. By this means it will readily be seen that the water in the pot is brought to a boil much quicker, thus saving much time. This is one great advantage of the conical-shaped projection $d$, entering the interior of the pot.

Arranged to be suspended in the pot and supported by the conical-shaped projection, is a grounds-receptacle $f$ perforated on all sides excepting its cover. This receptacle is also provided with a conical-shaped projection formed in its bottom and extending through and beyond its cover, and it is of such a size that it will fit over the projection $d$ and be held thereby a short distance above the bottom of the pot. The cover $h$ of this receptacle is provided with a central round hole and also a flange extending entirely around the same, and this flange fits over the upper edge of the side of the receptacle. The cover $h$ after being placed in position is held thereon by means of a pair of locks $g$ located diametrically opposite each other. These locks consist of a piece of wire pivoted to the side of the receptacle and having their lower ends bent at right angles thereto. Their upper ends are also bent in the same direction and are curved to form a loop for the convenience of the operator. The lower edges of these loops bear upon the top surface of the cover $h$. When it is desired to remove the cover, the loops are turned so as to disengage it, and it can then be removed by the fingers or in any suitable way.

Extending above the upper end of the conical projection that extends through the grounds-receptacle, is a wire-frame $e$, bent to form a loop at its upper end, and this loop fits over the conical projection $d$ and serves as a guide for the grounds receptacle. It also serves as a means for removing the receptacle from the pot, for it extends to the top thereof, and it will therefore be unnecessary to go below the surface of the boiling fluid in order to grasp the receptacle when it is desired to withdraw it from the interior of the pot. The loop is of a larger diameter than the end of the conical projection $d$, and between the two so as to fit snugly over the said end, is placed a small conical-shaped projection $k$ secured to the lid of the pot and extending downwardly from the under side thereof, and the upper end of this projection $k$ is left open and registers with an opening $n$ in the knob $l$ on the upper surface of the lid m. Thus the projection k fits snugly over the end of the projection d, and by means of the opening n in the knob l, a continuous passage or flue is formed from the bottom to the top of the pot. By means of this opening a greater circulation of heat is established, and the inner surface of the projection d heated much quicker.

When it is desired to use my device, the receptacle f is withdrawn from the pot, its cover h removed and the coffee-grounds placed therein, after which the cover h is replaced and secured in position by means of the locks g. The receptacle is then replaced in the pot, the lid put in position, and the pot placed on the stove. When the contents have boiled sufficiently, the receptacle can either be removed or left in the pot as the operator desires.

Having thus described my invention, what I claim as new is—

A coffee pot comprising a body portion, a centrally located conical flue extending vertically therein its entire length, a perforated grounds receptacle provided with a tapering passage extending through it, and adapted for the reception of the flue whereby the grounds receptacle is supported in position, a removable lid fitting over the receptacle, a swinging fastening device having a vertical axis and capable of being swung in and out of engagement with the lid, and a projection secured to the receptacle and extending vertically therefrom, whereby the receptacle may be lifted from its seat, substantially as described.

In testimony whereof I affix my signature in presence of two witnesses.

SVAN GELDBRANT.

Witnesses:
CHARLES WIBERG,
CHARLES S. HARRIS.